US012802090B2

(12) United States Patent
Izhak et al.

(10) Patent No.: US 12,802,090 B2
(45) Date of Patent: Nov. 17, 2026

(54) METHODS FOR VENDING MACHINE STOCK MANAGEMENT

(71) Applicant: Intelligent Fridges B.V., Nieuw-Vennep (NL)

(72) Inventors: Olena Izhak, Helsinki (FI); Carlos De La Cruz, Sollentuna (SE)

(73) Assignee: Intelligent Fridges B.V, Nieuw-Vennep (NL)

( * ) Notice: Subject to any disclaimer, the term of this patent is extended or adjusted under 35 U.S.C. 154(b) by 246 days.

(21) Appl. No.: 18/540,337

(22) Filed: Dec. 14, 2023

(65) Prior Publication Data

US 2025/0200593 A1 Jun. 19, 2025

(51) Int. Cl.
*G06Q 30/0202* (2023.01)
*G06Q 10/087* (2023.01)

(52) U.S. Cl.
CPC ....... *G06Q 30/0202* (2013.01); *G06Q 10/087* (2013.01)

(58) Field of Classification Search
None
See application file for complete search history.

(56) References Cited

U.S. PATENT DOCUMENTS

2007/0136125 A1* 6/2007 Godwin ................. G06Q 10/06 705/7.22
2020/0167722 A1* 5/2020 Goldberg ................. B64D 9/00

FOREIGN PATENT DOCUMENTS

CN 109558992 A * 4/2019 ............. G06Q 10/04
CN 121836572 A * 4/2026 ........... G06F 18/213

OTHER PUBLICATIONS

Umair Mehmood et. al., "Vending Machine Product Demand Prediction using Machine Learning Algorithms," 2023 International Symposium on Networks, Computers and Communications, pp. 1-6 (Year: 2023).*

* cited by examiner

*Primary Examiner* — Amanda Gurski
(74) *Attorney, Agent, or Firm* — Ipsilon USA—NLO

(57) ABSTRACT

A method for managing stock of a vending machine, and a system for performing the method by training a machine learning system to predict sales of a plurality of products available in the vending machine, the method comprising: receiving historical data comprising time series of sales of products from the vending machine on a plurality of days; filtering the historical data to form filtered historical data based on a ratio of the total number of days on which the product sold zero units relative to a total number of days the product has been sold for; comparing the ratio to a predefined threshold ratio; and filtering from the historical data, conditional upon the ratio being less than the predefined threshold ratio, the time series of sales of the product; and using at least parts of the filtered historical data for training the machine learning system.

19 Claims, 9 Drawing Sheets

S1

112

| Day ▷ | 1 | 2 | 3 | 4 | 5 | 6 | 7 |
|---|---|---|---|---|---|---|---|
| Product ▽ | | | | | | | |
| A | 5 | 2 | 0 | 0 | 13 | 2 | 1 |
| B | 0 | 0 | 1 | 0 | 0 | 3 | 2 |
| C | 12 | 1 | 3 | 0 | 0 | 0 | 12 |
| D | 13 | 14 | 14 | 12 | 13 | 13 | 13 |
| E | - | - | - | - | - | 5 | 2 |
| F | 2 | 5 | 13 | 2 | 12 | 2 | 12 |

116

114

| Day ▷ | 1 | 2 | 3 | 4 | 5 | 6 | 7 |
|---|---|---|---|---|---|---|---|
| Product ▽ | | | | | | | |
| A | 5 | 2 | 0 | 0 | 13 | 2 | 1 |
| D | 13 | 14 | 14 | 12 | 13 | 13 | 13 |
| F | 2 | 5 | 13 | 2 | 12 | 2 | 12 |

114a, b

Extract features from training data – S4

| Time series 1 [product A] | | | | | | | |
|---|---|---|---|---|---|---|---|
| Day ▷ | 14 | 15 | 16 | 17 | 18 | 19 | 20 |
| Feature ▽ | | | | | | | |
| Total sales on day | 5 | 2 | 0 | 0 | 13 | 2 | 1 |
| Prev. week total sales | 21 | 21 | 21 | 21 | 21 | 21 | 21 |
| Prev. week moving average total sales | 21 | 20 | 18 | 17 | 15 | 19 | 19 |
| Weekday | 0 | 1 | 1 | 1 | 1 | 1 | 0 |
| Weekend | 1 | 0 | 0 | 0 | 0 | 0 | 1 |
| Calendar day of month | 29 | 30 | 31 | 1 | 2 | 3 | 4 |
| Month | 12 | 12 | 12 | 1 | 1 | 1 | 1 |
| Sinusoid (Month) | -0.1 | -0.1 | -0.1 | 0.1 | 0.1 | 0.1 | 0.1 |
| Average Temp (°C) | 8 | 6 | 7 | 7 | 5 | 4 | 4 |
| Total rainfall (mm) | 0 | 1 | 10 | 12 | 5 | 2 | 1 |

Train machine learning algorithm on training data using extracted features – S5

Figure 7

METHODS FOR VENDING MACHINE STOCK MANAGEMENT

FIELD OF THE INVENTION

The present disclosure relates to stock management systems for vending machines, and more specifically to technologies for enabling more effective stock consumption predictions for vending machines.

BACKGROUND

Vending machines provide for the sales of products in an automated fashion, without requiring a human operator to facilitate sales transactions. Optimal stock, or product, management is important to ensure customers always have access to desired products from a vending machine, as missing products can prove of inconvenience to the customer. However, it is undesirable to overstock products within a vending machine because, for example, products may have limited shelf lives and are rendered unsuitable for sale after a period of time. Furthermore, selling and dispensing a product to a consumer which is past its shelf life is unpleasant, at best, and dangerous, at worst. Furthermore, purchasing habits or trends of consumers are often complex, and simple prediction strategies are typically inadequate for accurately predicting product sales from vending machines. Accordingly, it is desirable to improve methods for predicting product sales from vending machines.

BRIEF DESCRIPTION OF THE DRAWINGS

FIG. 7 illustrates schematically training data according to examples;

DETAILED DESCRIPTION

Figure 1:
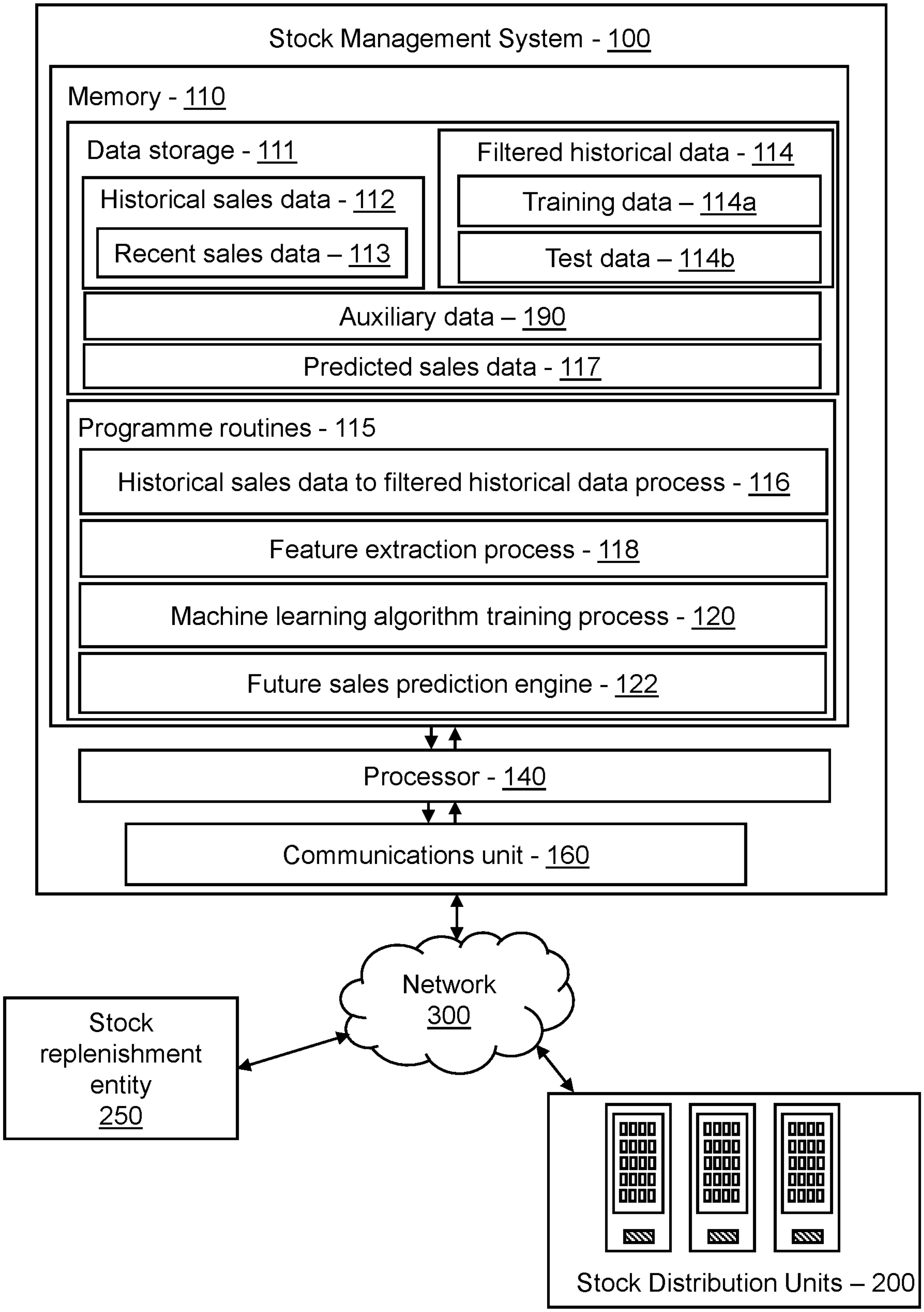
FIG. 1 shows a schematic overview of a stock management system according to examples.

An object of the disclosure is to predict sales of products available in a vending machine. This object may be achieved in accordance with the present invention, in some embodiments thereof, by methods and systems for the training and deployment of a machine learning system which can be used in predicting the sales of products available in the vending machine.

In a first aspect, a method for training a machine learning, ML, system to predict sales of a plurality of products available in a vending machine. The method comprises receiving historical data comprising a plurality of time series of sales, each time series of sales associated with a product of the plurality of products and representing sales of the product from the vending machine on a plurality of days; filtering the historical data to form filtered historical data by, for each time series of sales of the plurality of time series of sale: determining a ratio between (i) a number of days of the plurality of days represented by the time series of sales on which the vending machine sold zero units of the product associated with the time series of sales; and (ii) a total number of days of the plurality of days represented by the time series of sales, such that the ratio is a proportion of the total number of days on which the product sold zero units; comparing the ratio to a predefined threshold ratio; and filtering from the historical data, conditional upon the ratio being less than the predefined threshold ratio, the time series of sales of the product; and using at least parts of the filtered historical data for training the ML system.

The method can facilitate a higher quality of sales prediction by filtering sparse data from the training data. Filtering can enable that the training data is sufficiently information dense for reliable machine learning algorithms to be trained, for example. The filtering may vary dynamically depending on sales history, for example, and so upon a subsequent retraining different, training data may be different to at a first training, thereby adapting the training data based on current sales performance. Additionally, sparse data can result in biased trained models as the data is unlikely to be representative across the entire space it represents, and can thereby produce predictions which are only accurate in certain scenarios. Reducing the prevalence of sparse data in the training data may thereby facilitate the machine learning system has greater uptime in that it can prepare accurate predictions throughout the year, for example. In enabling a higher quality of sales prediction by the machine learning system, product consumption rates may be more accurately predicted which can reduce occurrence of product spoilage or otherwise products exceeding a shelf life of the product, for example, because there may be a lower risk of products being overstocked and remaining in the vending machine for too long due to insufficient sales.

In a second aspect, a system is provided. The system comprises one or more processors, and one or more non-transitory computer-readable media storing first computer executable instructions. The non-transitory computer-readable media storing first computer executable instructions, when executed by the one or more processors, cause the system to perform actions which substantially map to the operations caused by the steps of the method of the first aspect.

In a third aspect, one or more non-transitory computer-readable media storing instructions executable by one or more processors is provided. The instructions, when executed, cause the one or more processors to perform operations which substantially map to the steps of the method of the first aspect. The media may be usable by the system of the second aspect.

Features of the steps of the method of the first aspect are equally found in the instructions stored by the non-transitory computer-readable media of the second aspect and the actions performed by the system of the third aspect. Embodiments of the method can be understood to correspond to embodiments of the non-transitory computer-readable media and embodiment of the system where appropriate.

In some embodiments, filtering the historical data to form filtered historical data further comprises, for each time series of sales of the plurality of time series of sales: determining from the time series of sales whether a total sales duration, corresponding to a time between a first sale and a most recent sale of the time series of sales, exceeds a predefined threshold total sales duration; and filtering the time series sales from the historical data, conditional upon the total sales duration being less than the predefined threshold total sales duration. This can further improve the quality of training data by ensuring that a product has been sold for a sufficient period of time prior to being used for training of a machine learning algorithm, and can facilitate the machine learning algorithm being trained on a suitable quantity of training data.

In some embodiments, filtering the historical data to form filtered historical data further comprises, for each time series of sales of the plurality of time series of sales: determining from the time series of sales whether an intermediate sales duration, corresponding to a time between a first sale and a second sale of the times series of sales, exists which exceeds a predefined threshold intermediate sales duration, the first sale and the second sale being consecutive sales of the product associated with the time series of sales; and filtering the time series of sales from the historical data, conditional upon an intermediate sales duration existing which exceeds the predefined threshold sales duration. This can improve how representative the historical sales data is across the period of time which it covers, by reducing the occurrence of gaps above a threshold size in the time series in which no product sales occurred. This can improve the accuracy of the machine learning algorithms subsequently trained on the historical sales data by reducing a risk that the machine learning algorithm is biased towards specific time periods.

In some embodiments, the method further comprises, for each time series of sales in the filtered historical data, and for each day of the plurality of days represented by the time series of sales: extracting one or more features relating to the day from the time series of sales in the filtered historical data, and associating each feature to the sales of the day, using at least parts of the extracted one or more features for training the ML system. Advantageously, feature extraction may identify and isolate the most relevant features that contribute significantly to the decision-making process of the ML system. Purchasing patterns of consumers, corresponding to the rate of sales of a product from a vending machine, may vary based on different factors which are represented by the features.

In some embodiments, extracting one or more features from the filtered historical data comprises extracting a temporal feature, the temporal feature being at least one of: the number of the day during a month the day corresponds to, the number of the month the day corresponds to, the number of the year that the day corresponds to, a number of the day during a week it corresponds to, a flag indicating whether the day corresponds to a weekend or, a flag indicating whether the day corresponds to a federal holiday. Purchasing patterns of consumers may vary depending on what year it is, month it is, day of the week it is, whether it is a weekend or a weekday, or whether it is a holiday, for example.

In some embodiments, extracting one or more features from the filtered historical data comprises extracting a cyclically transformed feature which corresponds to the temporal feature being transformed by a sinusoidal function, the sinusoidal function having a period corresponding to a characteristic cyclical behavioral period of the time series. In some examples, the temporal feature is the number of the day and the characteristic behavioral cyclical behavioral period is a month the day corresponds to. In other examples, the temporal feature is a month the day corresponds to, and the characteristic cyclical behavioral period is a year. A cyclically transformed temporal feature can more effectively represent cyclical behavior when training the machine learning algorithm, by ensuring similar temporal information, such as similar points of a year, are mapped to similar numerical feature values. Purchasing patterns of consumers may vary depending on what time of day it is, the season of the year, and so on.

In some embodiments, extracting one or more features from the filtered historical data comprises extracting one or more aggregated sales features corresponding to an aggregation of sales of the time series of sales across a number of days of the time series. Advantageously, considering aggregated sales in predicting future sales may further enhance the accuracy of the trained machine learning algorithms.

In some embodiments, the aggregated sales feature corresponds to an average sales per day across a week, or a total sales for the week.

In some embodiments, the method further comprises receiving weather conditions data corresponding to the historical data, the weather conditions data comprising weather data in association with time periods; and extracting one or more features from the filtered historical data comprises determining, using the weather conditions data, for each day of the plurality of days represented by the time series of sales, a weather conditions feature corresponding to weather conditions during the day. Including weather conditions in the features can enhance an accuracy of the trained machine learning algorithms. Purchasing patterns of consumers may vary depending on the weather, such as whether it is hot, sunny, cold, windy, wet, humid, or dry, for example.

In some embodiments, the weather conditions feature comprises at least one from: a number indicating a maximum temperature during the day, a number indicating a minimum temperature during the day, a number indicating a maximum humidity during the day, a number indicating a minimum humidity during the day, and a number indicating a total rainfall during the day.

In some embodiments, the machine learning system comprises a plurality of machine learning algorithms, wherein the method comprises: dividing the filtered historical data into training data and test data, training each of the machine learning algorithms using the training data, and evaluating the performance for each of the machine learning algorithms, comprising: for each of the plurality of products: testing each of the machine learning algorithms using the test data, and determining a performance score of each of the machine learning algorithms for the product; and identifying the machine learning algorithm of the plurality of machine learning algorithms having a highest performance score for the product. Training a plurality of machine learning algorithms can allow a variety of machine learning architectures to be used, which each may have strengths and weaknesses depending on the training data at hand. Evaluating the respective performance of the plurality of machine learning algorithms for each product can therefore allow a most suitable machine learning algorithm to be used, improving the overall sales prediction accuracy of the machine learning system for each product, for example.

In some embodiments, the plurality of machine learning algorithms comprises at least two from: (i) a gradient boosted decision tree algorithm, (ii) a random forest ensemble learning algorithm, and (iii) a long short-term memory neural network algorithm.

In some embodiments, the performance score comprises computing at least one from: (i) mean squared error, (ii) mean absolute error, (iii) root mean squared error, and (iv) mean absolute percentage error of predictions from the machine learning algorithm compared with the sales represented by the test data, the highest performance score corresponding to the lowest respective error.

In some embodiments, each machine learning algorithm generates a respective predicted time series of sales corresponding to a plurality of days, each day comprising a predicted number of sales of a product; and wherein evaluating the performance score comprises aggregating the predicted number of sales across a number of days of the plurality of days into aggregated predicted sales data, and aggregating a number of sales of the test data across the number of days into aggregated test data, and determining a performance score based on the aggregated predicted sales data and the aggregated test data. In this way, predicted sales can be generated on a day-by-day basis, but evaluation in determining a performance score can take place on a longer time span, and can thereby avoid being overly sensitive to day-by-day discrepancies between predicted data and test data. This can produce a more suitable performance score, for example, which may be aligned with a more appropriate stock replenishment rate of the vending machine, as typically a vending machine is only replenished on a weekly basis, for example.

In some embodiments, for each product, dividing the filtered historical data into training data and test data, training each of the machine learning algorithms using the training data, and evaluating the performance for each of the machine learning algorithms is performed at a first time; and the method further comprises: receiving new data comprising a time series of sales of the plurality of products from the vending machine relating to a predetermined time period subsequent to the first time; evaluating the performance for each of the machine learning algorithms by, for each of the plurality of products, comparing predictions from the machine learning algorithm trained with at least parts of the new data to determine an updated performance score of each of the machine learning algorithms; and identifying the machine learning algorithm of the plurality of machine learning algorithms having a highest updated performance score for the product. This can allow continual updates of the machine learning system to use the best performing machine learning algorithm. This can allow the machine learning system to dynamically select an algorithm, per product, based on which algorithm is currently performing most effectively. Accordingly, an overall sales prediction performance of the machine learning system can be improved by, if necessary or advantageous, swapping the machine learning algorithm currently being used for output predictions for a product based on performance.

The present invention will be described more fully hereinafter with reference to the accompanying drawings, in which embodiments of the invention are shown.

FIG. 1 illustrates schematically an overview of a stock management system 100 according to one embodiment. As an overview, the stock management system 100 monitors the number of products stored within a plurality of stock distribution units 200 and instructs a stock replenishment entity 250 to restock the stock distribution units 200 when required.

The stock management system 100 comprises a processor 140 which interacts with and executes data and program routines stored in memory 110. In this example, the memory 110 comprises data storage 111 for storing historical sales data 112, auxiliary data 190, filtered historical data 114 including training data 114*a* and test data 114*b*, recent sales data 113 and predicted sales data 117. The respective purposes of each stored data will be described later. The memory 110 also stores program routines which allow for the execution of a historical sales data to filtered data process 116, a feature extraction process 118, a machine learning algorithm process 120, and a future sales prediction engine 122. The respective purposes of each process will be described later. The stock management system 100 also comprises a communications unit which communicates with a network 300 and via which communications with the stock replenishment entity 250 and stock distribution units 200 can be managed.

As an overview of the role performed by the stock management system 100: the stock management system 100 receives historical sales data 112 from the stock distribution unit 200 (also referred to herein as a vending machine). The historical sales data is processed to produce filtered historical sales data 114, which can be split into training data 114*a* and test data 114*b*. The stock management system 100 may also receive auxiliary data 190 (such as weather data, for example) which can augment the training data 114*a* of the filtered historical data 114. The training data 114*a* is used to train at least one machine learning algorithm, and in examples a plurality of different machine learning algorithms. Once trained, the machine learning algorithm or machine learning algorithms can be evaluated for sales prediction performance and deployed as part of the future sales prediction engine 122 to predict future sales. The future sales predictions can be used to inform the stock replenishment entity 250 when to replenish stock of the stock distribution units 200. In some examples, after an initial deployment of the future sales prediction engine 122, the historical sales data 112 is updated to include recent sales data 113 and can both retrain the machine learning algorithms and re-evaluate the performance of the machine learning algorithms of the future sales prediction engine 122 based on these recent sales 113 to thereby refine the future sales prediction engine 122. This overview is depicted by a flowchart in FIG. 2, in view of which the aforementioned data 112, 114, 113, 117, 190 and processes 116, 118, 120, 122 are described in more detail, later.

More generally, the stock management system 100 can comprise any suitable arrangement or configuration of a computing device or computing devices which permits the storage of the aforementioned data 112, 114, 113, 117, 190, and execution of the aforementioned processes. For example, the storage may comprise remotely accessible cloud storage or locally accessible solid-state disk storage or hard drive storage, or storage on a locally networked server, for example. Programs of instructions for the aforementioned processes may also be stored on the same storage, or in their own respective storage, for example. Similarly, execution of the aforementioned processes may take place on a local processor, such as a local processor of a personal computer, or may be executed on a locally networked server, or may executed on a cloud-based server, for example. Each process may be executed on a respective different processor, or may be performed on a same processor. The storage management system 100 may comprise circuitry which is configured to implement (using one or more non-transitory computer-readable media) the functionality described herein. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits). Those skilled in the art will understand that the above-described exemplary embodiments may be implemented in any suitable software, hardware, or firmware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the described methods may be embodied as a program containing lines of code stored on a non-transitory computer readable storage medium that, when compiled, may be executed on a processor or microprocessor.

Similarly, the network 300 may comprise any suitable arrangement or configuration which permits the intercommunication of computing devices, and more generally can be understood to represent a communication means by which information is transferred between the stock management system 100 and the stock distribution units 200 and the stock replenishment entity 250. Information need not be transferred between the stock management system 100 and the stock distribution units 200 in the same manner as between the stock management system 100 and the stock replenishment entity 250, for example. The network 300 can therefore represent communication between the aforementioned entities by Bluetooth, Wi-Fi, Local Area Network, Wide Area Network, Near Field Communication, Infrared, Zigbee or Z-Wave, Cellular Networks such as 3G, 4G, or 5G, Satellite Communication and Ethernet protocols, for example. Additionally, information may be transferred between entities by physical transfer of storage devices, for example, such as flash memory drives, solid state drives, hard drives, external hard drives, optical discs, or memory cards.

The stock distribution units 200 represent, in this example, a plurality of vending machines from which a plurality of products can be purchased by consumers. Each vending machine may store a plurality of different products, and each vending machine may store different products to the other vending machines, or in different quantities or ratios. The vending machines may be distributed geographically within a similar area, such as within a shopping mall or shopping center, within a public location such as a library or train station or bus station, or may be distributed geographically across a relatively larger area such as a town, city, borough, county, or country, for example. In other examples, the stock distribution units 200 may comprise just a single vending machine, for example. The stock distribution units 200 may be located at the same location as the stock management system 100. In some embodiments, the stock management system 100 is implemented in a stock distribution unit 200.

The stock replenishment entity 250 represents an entity responsible for delivering new stock to the stock distribution units 200. The stock replenishment entity may be located at the same location as the stock management system 100, for example, or may be located at the same location as stock distribution units 200, for example, or all may be located at the same location. The stock replenishment entity 250 may be a logistics and fulfilment organization, for example. In general, the stock management system 100 can provide information to the stock replenishment entity 250 indicating a number of a plurality of products to be delivered to respective stock distribution units 200.

Figure 2:
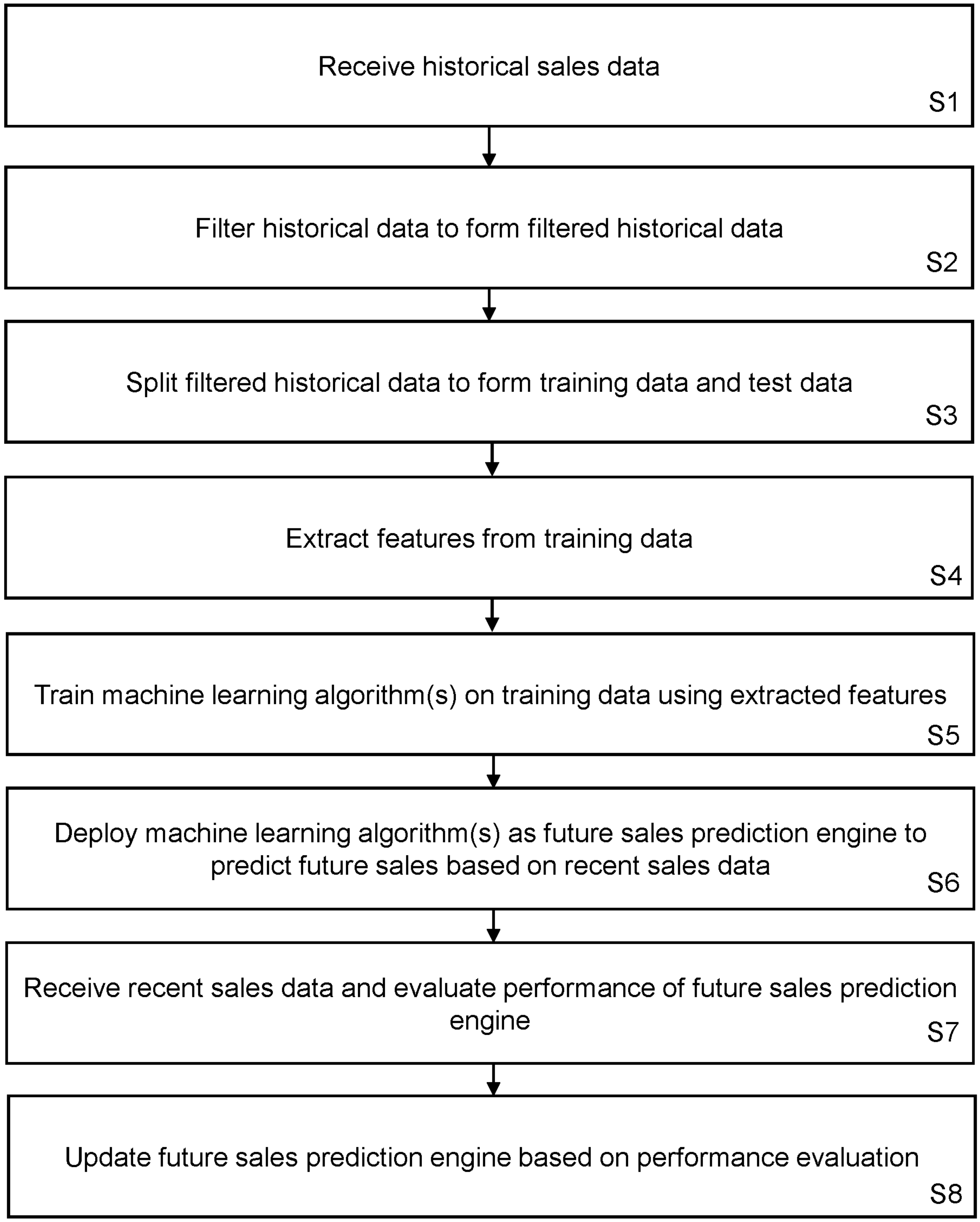
FIG. 2 is a flowchart illustrating steps performed by the stock management system according to examples.

An example of the overarching process flow performed by the stock management system 100 will now be described. Steps S1-S8 of the overarching process flow are illustrated in FIG. 2.

At item S1, historical sales data 112 is received by the stock management system 100, for example via the communications unit 160 and the network 300. In this example, the historical sales data 112 is received from the stock distribution units 250, but in other examples may be received from other sources such as other stock distribution units 250, such as from stock distribution units in other locations such as other cities or countries, for example. That is, the historical sales data does not necessarily need to be sourced from the stock distribution units for which the stock management system 100 will later predict sales for, although doing so may improve the accuracy of sales predictions, for example.

Figure 3:
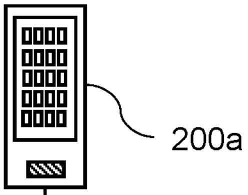
FIG. 3 schematically illustrates historical sales data and filtered historical sales data according to examples.

FIG. 3 illustrates an example of historical sales data 112. The historical sales data 112 comprises time series sales information, and more specifically in this example a time series of sales for each of a plurality of products. The skilled person will appreciate that in some examples, the historical sales data may comprise only a single time series corresponding to a single product, but more generally can comprise a plurality of time series, each time series corresponding to a respective product. In this example, the time series is a series of days, and the sales information is a total number of a product sold on each day. In the example historical data of FIG. 3, only 7 days of the time series for 6 products, A-F, are shown for explanatory clarity. It will be appreciated that, in other examples, there may be fewer or more products, such as just one product, or twenty, fifty, or upwards of one hundred products, or one thousand products, for example. Similarly, the time series may cover shorter or longer time spans such as a day, a month, six months, a year, or several years, for example. Each product has a respective time series of a respective length, which may also vary. For example, product A may have been sold for a length of 7 days, whilst product D may have been sold for a length of 300 days, for example. A length is a duration of days over which the product has been sold, and can correspond to time span between the first day the product was provided at the stock distribution unit to a later date at which the historical data ends, for example. The time series may in other examples feature different temporal steps; that is, in the current example each time series step corresponds to a day, whereas in other examples each time series step may correspond to longer steps such as two days or a week, for example, or shorter steps such as hours or minutes, for example. In addition, the historical sales data may comprise information such as the price of a product on each day or time step.

At item S2, the historical data 112 is filtered to form filtered historical data 114. In general, this step may reduce the size of the historical data set 112 depending on the sparsity of the historical data 112 by considering the consistency with which a product is sold through the historical data 112. Steps of S2 are considered in more detail in view of FIG. 4.

At item S3, the historical data is split to form training data **114*a* and test data 114*b*. In general, the training data 114 is used to train the machine learning algorithm, or machine learning algorithms, which form the future sales prediction engine 122, and the test data 114***b* is used to evaluate the performance of the trained machine learning algorithm, or machine learning algorithms as part of the future sales prediction engine 122. Steps of S3 are considered in more detail in view of FIG. 5.

At item S4, features are extracted from the training data. In general, the features are provided during the training of the machine learning algorithm to help improve the accuracy of predictive capabilities of the machine learning algorithm. Steps of S4 are considered in more detail in view of FIG. 6.

At item S5, the machine learning algorithm or machine learning algorithms are trained on the training data 114*a* using extracted features. This can involve multiple, iterative stages of optimization and performance evaluation until the machine learning algorithms have sufficiently accurate predictive capabilities, for example.

At item S6, the trained machine learning algorithm, or machine learning algorithms, are deployed as the future sales prediction engine to predict future sales based on recent sales data. In general, the future sales prediction engine receives historic sales data, which can include recent sales data, from the stock distribution units 200 via the network 300, and predicts future sales of the stock distribution units 200. Item S6 is considered in more detail in view of FIG. 8.

At item S7, the performance of the future sales prediction engine is evaluated. In general, this involves assessing the performance of the future sales prediction engine after deployment and in comparison to actual sales of the stock distribution units. Item S7 is considered in more detail in view of FIG. 9.

At item S8, the future sales prediction engine is updated based on the performance evaluation performed at item S7. In general, this can involve changing the machine learning algorithm currently being used to output predictions to the stock replenishment entity 250 based on recent performance of each machine learning algorithm. Item S8 is considered in more detail in view of FIGS. 10 and 11.

Filtering Historical Data

Figure 4:
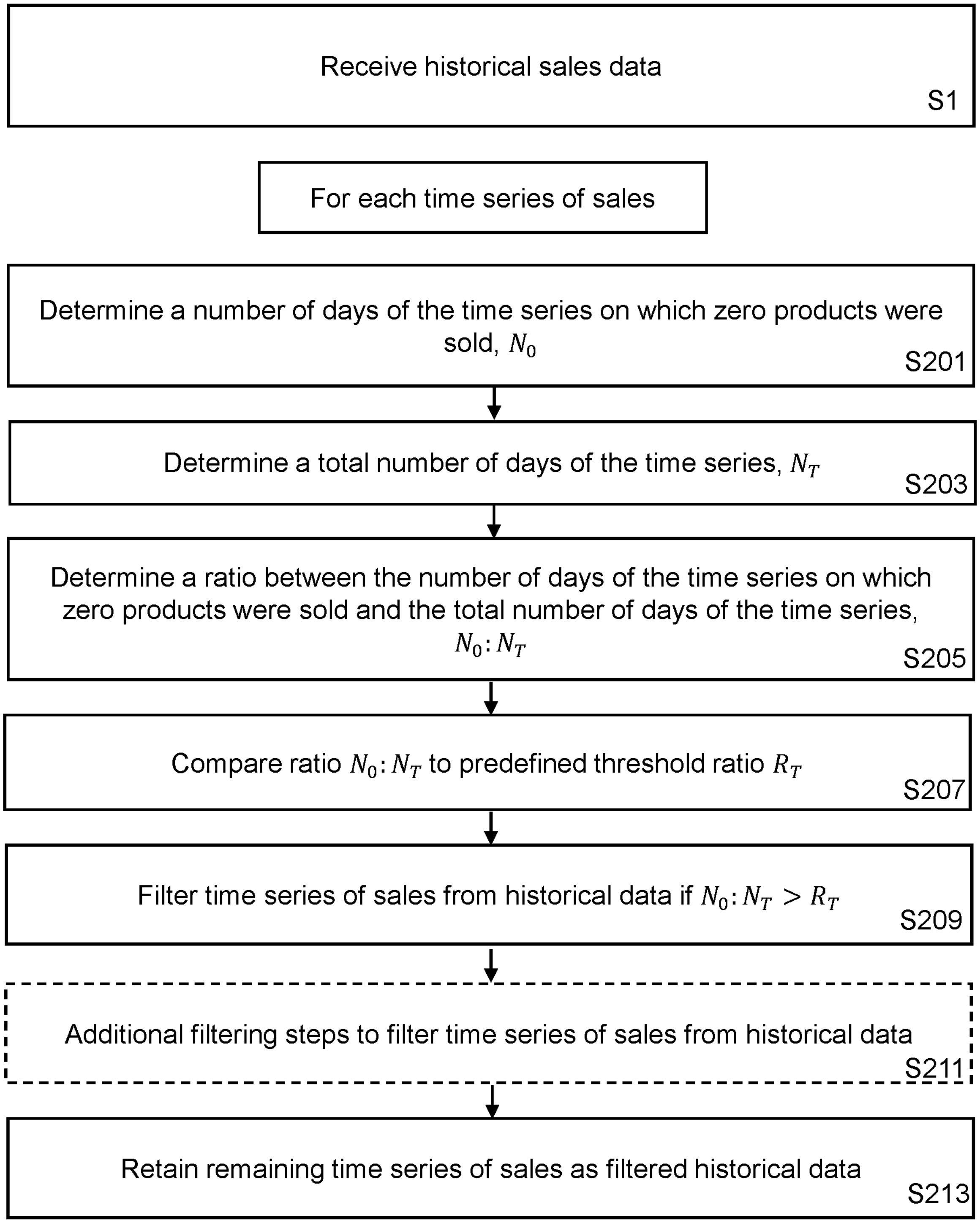
FIG. 4 is a flowchart illustrating steps for producing filtered historical sales data according to examples.

The process of filtering historical data to prepare filtered historical data which can be used as training data will now be described, corresponding to item S2 in FIG. 2. FIG. 3 illustrates schematically historical data and filtered historical data, according to examples, and FIG. 4 illustrates a flowchart detailing steps undertaken to filter historical data to prepare filtered historical data according to an example.

At item S1, as described previously, historical data is received from the stock distribution units. The historical data is to be filtered based on the contents of time series of sales. Steps S201-S213 of the flowchart of FIG. 4 are performed for each time series of the historical data and accordingly are described in reference to a single time series which is the time series for which the filtering process is presently being performed. At any point, data normalization such as normalization of time stamps of the time series may be performed to improve or assure uniformity of data formats cross the historical data, filtered historical data, training data, or test data sets, for example. In this example, data normalization is performed when the historical data is received from the stock distribution units.

At item S201, a number of days on which zero products were sold, $N_0$, is calculated. That is, the historical data contains an entry, such as "0", or null, which indicates no sales were made of the product on that day. More generally, for time series which have time steps different to days, this corresponds to calculating a number of time steps on which no sales were made. This may further include aggregating a number of time steps to a larger time period, such as aggregating hours in which no sales were made to calculate a day on which no sales were made, for example.

At item S203, a total number of days represented by the time series, $N_T$, is calculated. This may be the length of the time series as stored in the data, or may be indicated by a flag variable representing that sales have begun or the stock distribution unit has started stocking the product, for example.

At item S205, a ratio between the number of days of the time series on which zero of the products were sold, $N_0$, and the total number of days of the time series, $N_T$, is calculated. This ratio, $N_0:N_T$, can be considered a proportion of the total number of days on which no products were sold. This can be considered to represent a sparsity of the data, in that the greater this ratio the more "zero products sold" entries exist within the time series. The skilled person will appreciate how, alternatively, a ratio of the number of days on which products were sold to the total number of days can also represent sparsity and adapt the calculation accordingly.

At item S207, the ratio calculated at item S205, $N_0:N_T$, is compared to a predefined threshold ratio. The threshold ratio can be, for example, 0.8, which corresponds to no sales on 80% of the total days, or in other words a condition that the product must be sold on at least 20% of days for the time series of sales to form training data. In other examples, the threshold ratio can be 0.5, for example, which corresponds to no sales on at least 50% of the total days, corresponding to a condition that the product must be sold on a majority of days of the time series for the time series of sales to form training data. In other examples, the threshold ratio can be 0.25, which corresponds to no sales on 25% of the total days, corresponding to a condition that the product must be sold on at least 75% of the total days of the time series for the time series of sales to form training data. It will be appreciated that other threshold ratios are possible, such as 0.1, 0.2, 0.3, 0.4, 0.6, 0.7, and 0.9, and more generally values between 0 and 1. The threshold ratio can be thought of as a limit on the acceptable sparsity of the data. The threshold ratio may be different for different products and may be different based on a total length of the time series, for example. The threshold may be configurable and updated at different points in time, for example.

At item S209, the time series is filtered from the historical data if the calculated ratio exceeds the predefined threshold ratio, that is if the condition $N_0:N_T>R_T$ is met. The time series meeting the aforementioned condition $N_0:N_T>R_T$ means that the time series will not be used for training or evaluating of the machine learning algorithms. This condition indicates that the time series contains too many days on which no products were sold. In other words, the time series is considered too sparse and is filtered from the historical data. Filtering from the historical data can involve deleting the currently considered time series, or can involve not including the current time series in a filtered historical data set.

At item S211, additional filtering steps to filter time series of sales from the historical data may be performed in some examples. These additional filtering steps may take place prior to or after items S201-S209, for example.

For example, in a first additional filtering step, a total sales duration is calculated based on an earliest recorded sale, or day of sales, in the time series and a most recently recorded sale, or day of sales, in the time series. In some example, this corresponds to the total length of the time series. Time series with a total sales duration less than a predefined total sales duration may be filtered, such that training data only comprises data with total sales duration above the predefined total sales duration. For example, the total sales threshold duration may be 180 days. Even if the time series is relatively dense with regards to the ratio $N_0:N_T$, by considering the total sales duration and filtering based on the same, the time series also reflects a long enough period of time before being used as training data which can improve the quality of the training data. In some examples, the total sale threshold duration is substantially a year, such as 365 days, such that the time series reflects sales in all seasons of a year, for example. In other examples, an aggregated number of product sales is considered and compared against an aggregated product sales threshold to facilitate the training data reflecting sufficient number of sales in total to be used as training data, which can improve the quality of the training data.

For example, in a second additional filtering step, which may be implemented additionally or alternatively to the first additional filtering step, an intermediate sales duration may be calculated. The intermediate sales duration corresponds to times between consecutive sales. For example, if sales occurred on a first day, and then no sales were recorded until sales were recorded on a later, second day, the number of days between the first day and the second day would correspond to the intermediate sales duration. It can be established whether an intermediate sales duration exists which exceeds a threshold intermediate sales duration. That is, every intermediate sales duration for a given time series can be calculated, and it is checked whether any of the intermediate sales durations exceed the threshold intermediate sales duration. Time series with an intermediate sales duration exceeding the threshold intermediate sales duration can be filtered. This can correspond to sales data having a significant gap, such that whilst the ratio $N_0:N_T$ may not indicate data sparsity, the significant gap may negatively impact the effectiveness of the time series if used as training data.

The intermediate sales period may be a proportion of the total sales period, for example, such as an intermediate sales period of half the total sales period, or a third of the total sales period, or a quarter of the total sales period, which can allow the intermediate sales period to scale with the total sales period. The intermediate sales period may be a predetermined number of days independent from the total sales period, for example five days, or ten days, or fourteen days, for example. The intermediate sales period may be a proportion of the total sales period for a total sales period below a certain duration, and a predetermined number of days for a total sales period above a certain duration, which can prevent the intermediate sales period from being too long a duration, for example. The intermediate sales can be different for each product, and can be configurable to have different values at different periods in time, for example.

At item S213, data which has not been filtered in steps S209-S211 is retained as filtered historical sales data, and can proceed to be used for training and/or testing of the machine learning algorithms at items S3-S8.

Considering the above filtering steps in the context of example historical data 112 of FIG. 3: Product B has sold zero products on day 1, 2, 4, and 5, and has been sold for a total of 7 days. Accordingly, the ratio $N_0:N_T$ is approximately 0.57 and exceeds an example threshold ratio of 0.5. Product B is therefore filtered from the historical data 112 and is not present in the filtered historical data 114, in this example. Product C has sold zero products on days 4, 5, and 6, and has been sold for a total of 7 days, so the ratio $N_0:N_T$ is approximately 0.43. This does not exceed the example threshold ratio of 0.5. However, product C has sold zero products for 3 or more days in a row, on days 4, 5, and 6, and so is filtered on comparison with being equal or greater to an example intermediate sales duration of 3. Product E has only been sold for 2 days; whilst it does not exceed the threshold sales ratio of 0.5, or equal or exceed the intermediate sales duration of 3, it does not exceed an example total sales duration threshold of 3, and so is also filtered. Accordingly, the filtered historical data 114 comprises just products A, D, and F from the originally received products A, B, C, D, E, and F in the historical data 112.

Forming Training and Testing Data

Figure 5:
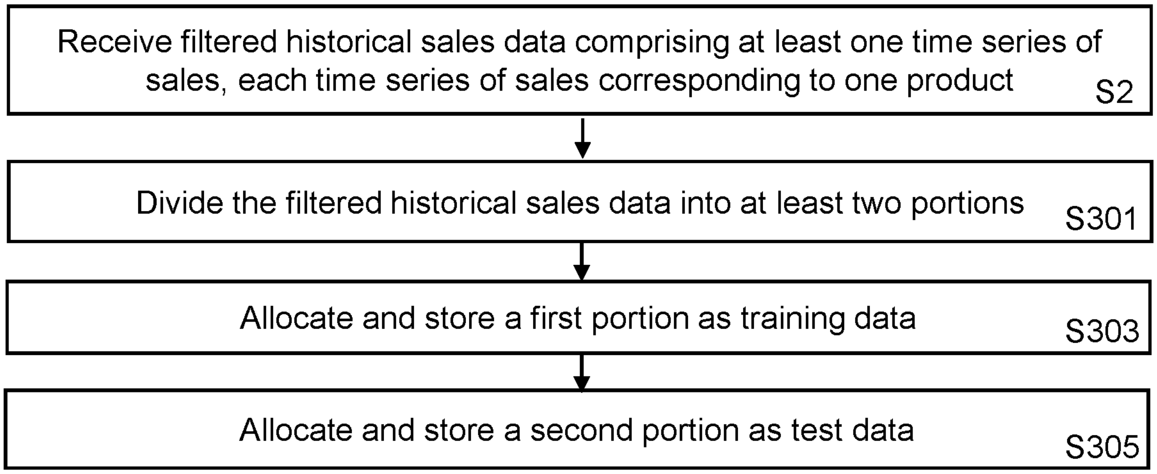
FIG. 5 is a flowchart illustrating steps for splitting filtered historical sales data into training data and test data according to examples.

In FIG. 5, depicting steps of S3, the filtered historical sales data, acquired at item S213, is apportioned into training data and test data. The training data and test data is to be used to train the machine learning algorithms of the future sales prediction engine 122. Each machine learning algorithm may use different training and test data derived from the same filtered historical sales data, for example depending on the relative performance strengths and limitations of the respective machine learning algorithm and the corresponding training and testing data which should be used therewith.

At item S301, the filtered historical sales data is divided into at least two portions. The division may be performed on the basis of stock distribution units; for example, the sales data originating from a first plurality of stock distribution units is to be used for training, whilst the sales data originating from a second plurality of stock distribution units is to be used for testing. The first plurality and second plurality may be determined randomly, for example. In examples, substantially 85% of the filtered historical sales data may be used as training data whilst 15% is used for testing. However, different proportions can be employed depending on specific requirements. In other examples training data and testing data is extracted from all the stock distribution units. For example, for a given stock distribution unit, a first portion of historical sales data can be filtered and form training data whilst a second portion of the historical sales data can be filtered and form test data. In examples, division is performed on each time series to separate each time series into training data and test data. For example, a time series of sales for a product can be divided into the two portions, a first period of the time series forming the training data and a second period of the time series forming the test data, for example. The training data and test data may be formed from a mixture of the aforementioned division techniques.

At item S303, a first portion of the at least two portions is allocated and stored as training data 114*a*.

At item S305, a second portion of the at least two portions is allocated and stored as test data 114*b*.

Feature Extraction

Figure 6:
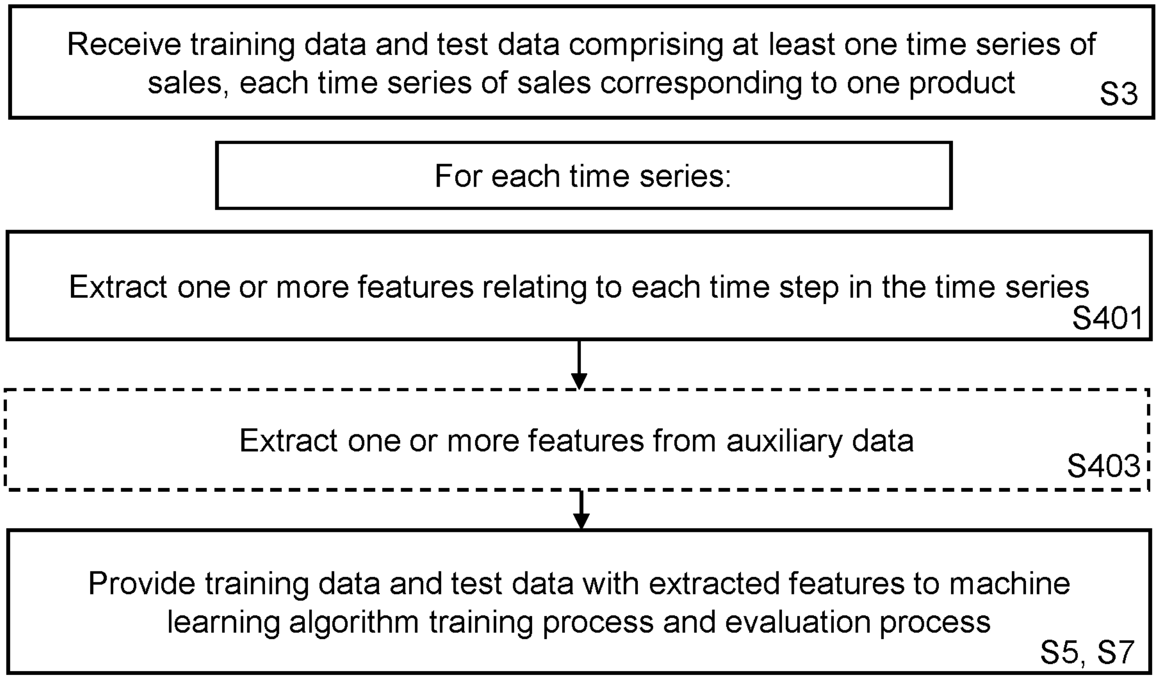
FIG. 6 is a flowchart illustrating steps for extracting features from training data according to examples.

In FIG. 6, features are extracted from the training data acquired at S3. Feature extraction, as described herein, can refer more generally to feature engineering in that it represents the process of creating, selecting and refining features for use in training a machine learning algorithm. The process of feature extraction, described hereafter, is performed for both training data and test data.

FIG. 7 illustrates an example of training data 114*a* or test data 114*b* in association with the extracted features of S401 and S403. S401 and S403 occur for each time series within the filtered historical data set. Therefore, "the time series" refers to the time series currently being processed of the plurality of time series forming the filtered historical data set.

At S401, one or more features related to each time step in the time series are extracted. In the present example, the time series is a series of days of sales, so each day has respective features extracted, or generated, in association with it. FIG. 7 is an illustration of an example piece of training data 114*a*. Each column represents a different day of the time series of data, in this explanatory example displaying day 14 to day 20 of the time series. The day of the time series is not, in this example, the same as the calendar date to which the day corresponds, though in examples these may be the same. Each row represents a feature value for this day.

A first feature type which can be extracted relates to a measure of sales. A first example of a measure of sales, displayed in the first row of the features, is the total sales on that day. A second example of a measure of sales, displayed in the second row of the features, is the previous week total sales. In this example this value is the same for each of days 14-20 and corresponds to the total sales recorded between days 7 to 13, not displayed in FIG. 7. A third example of a measure of sales, displayed in the third row, is a moving average of sales from the previous weeks. That is, on day 14 the associated row entry might represent average sales per day between days 7 and 13. On day 15, the associated row entry might represent average sales per day between days 8 and 14, and so on. The moving average can be of a different previous time span, such as a month to date or year to date, for example.

A second feature type which can be extracted relates to temporal information. A first example of a temporal feature can be flags indicating a weekday or a weekend, displayed in the fourth and fifth row of the features respectively. This value is "0" to indicate false and 1" to indicate true. For example, day 14 is a weekend day so is allocated "0" in the weekday row and "1" in the weekend row. Other flags can be used, for example to indicate that a day is a federal or public holiday, for example.

A second example of a temporal feature is day of the month to which the day of the time series corresponds. That is, the calendar date of the month. In this example, the day of the month is stored in the sixth row of the features. For example, day 16 corresponds to the 31$^{st}$ December. Day 17 corresponds to the 1$^{st}$ January. Accordingly, day 16 has "31" stored in the sixth row, whilst day 17 has "1" stored in the sixth row. In other examples, the day of the year may be stored, such that day 16 would have "365" stored in the respective row, and day 17 would have "1" stored in the respective row, for example.

A third example is a month or a year to which the day belongs. In this example, the month is stored in the seventh row of the features. For example, days 14, 15 and 16 are in December, so are allocated "12" in the month row, whereas days 17, 18, and 19 are in January, so are allocated "1" in the month row.

Another example of a temporal feature, illustrated by an example in the eight row of the features, is a sinusoidal transformation of another temporal feature. The sinusoidal transformation is achieved by a sinusoidal function which can comprise cosine and sine functions, for example, including combinations thereof and may comprise phase shifts, scaling transformations, and translations, for example. In general, the sinusoidal function can map numerically disparate values to relatively more similar numerical values. In the example of FIG. 7, this function maps the month feature to a sinusoidally transformed version of the month feature. That is, December and January can experience similar weather and the likes, and so can be regarded as similar months. However, in the month row, they are allocated values 12 and 1 respectively. In the sinusoidally transformed feature, these are allocated more similar values, such as "−0.1" and "0.1", which can help the machine learning algorithm interpret these months as being similar. More generally, sinusoidal transforms are based on an underlying cyclical behavior period, the total duration across which behavior is anticipated to be cyclical. For example, in the case of a day, 23:00 and 00:00 are times with similar characteristics, and so the period of the associated sinusoidal function would be 24 hours.

Features derived from other sources may be used in addition to those generated or extracted from the time series of sales. Generally, these other sources can be considered to form auxiliary data 190. At least some of the auxiliary data 190 may be received by the stock management system 100 from the stock distribution units 200. Alternatively or additionally, at least some of the auxiliary data 190 may be sought from external sources by the stock management system 100 in view of the time series of sales. For example, the stock management system 100 may determine the date range represented by the time series of sales, and then seek other data related to this same date range. In some examples, data contained within or features derived from auxiliary data are provided with the historical sales data itself, that is, as part of the time series.

One example of features extracted from auxiliary data 190 is weather conditions data, represented by the ninth and tenth rows of the features in FIG. 7. The ninth row contains an average temperature of the day, and the tenth row indicates total rainfall on that day. Other examples of weather conditions include a value indicating any one of an average, maximum, minimum, variance, or other quantity of: temperature, humidity, hourly rainfall, windspeed or sunlight hours, for example.

In another example of auxiliary data and features extracted therefrom, a geographical location of a stock distribution unit is extracted. This could identify the particular time series as originating from a shopping mall, a cinema, a train station, a town, a city, or a particular country, for example. In some examples, the auxiliary data may indicate geographical clustering of stock distribution units, which reflects that the stock distribution units are located relatively closely to one another, for example.

Future Sale Prediction Engine

Figure 8:
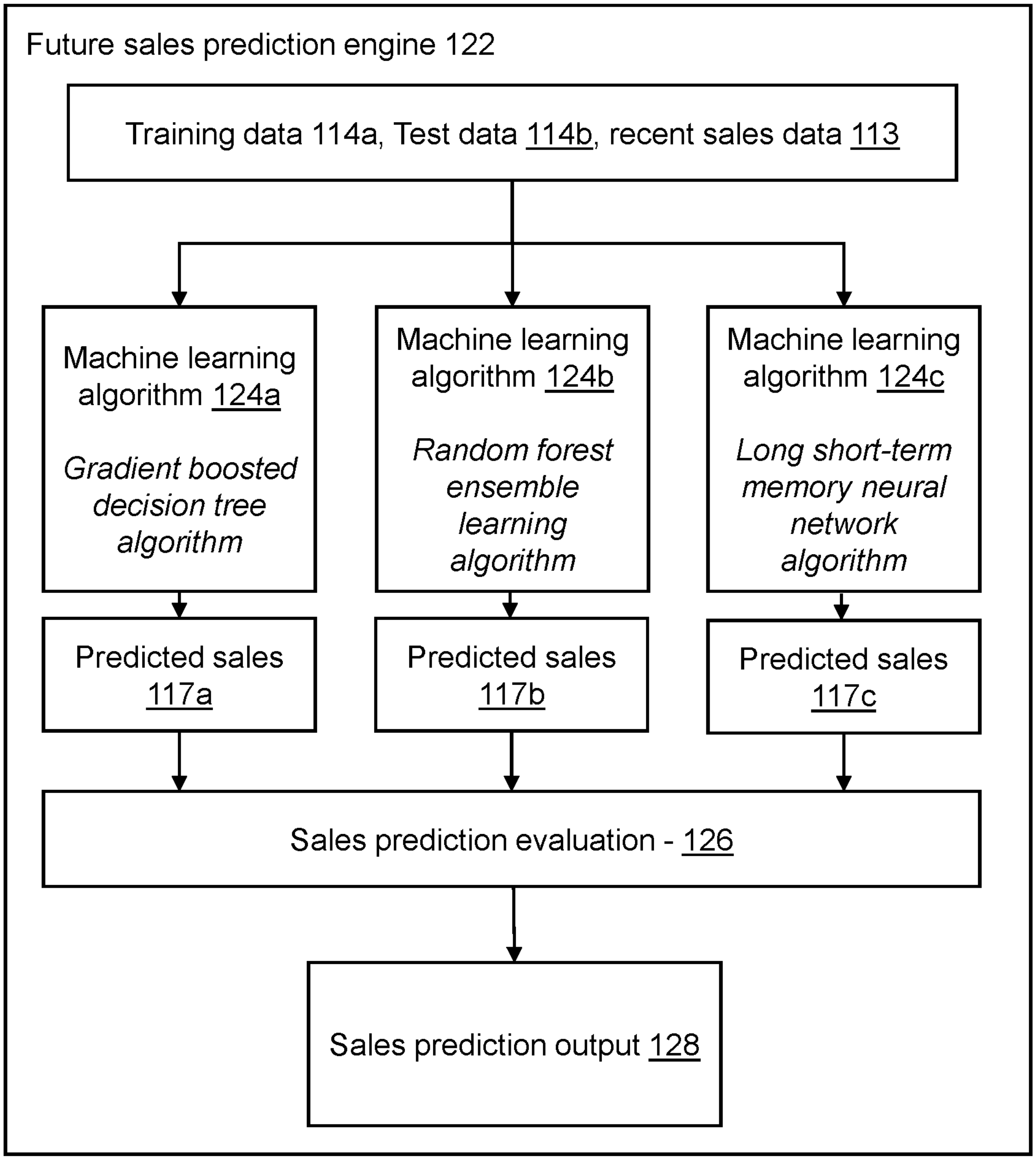
FIG. 8 is a flowchart illustrating a future sales prediction engine of the stock management system according to examples.

FIG. 8 illustrates schematically the future sales prediction engine 122 in more detail. The future sales prediction engine 122 comprises a plurality of machine learning algorithms 124*a-c* which are trained, at item S5, on the training data produced at item S4. In this example, the future sales prediction engine 122 comprises a first machine learning algorithm 124*a* which is a gradient boosted decision tree algorithm, a second machine learning algorithm 124*b* which is a random forest ensemble learning algorithm, and a third machine learning algorithm 124*c* which is a long short-term memory neural network algorithm. The long short-term memory neural network may include an attention layer to enhance its learning capabilities, for example. In other examples, just a single machine learning algorithm may be provided, or a different number of machine learning algorithms may be provided. Similarly, other types of machine learning algorithms may be used additionally or alternatively to the examples listed above.

As will be appreciated by the skilled person, at S5 a variety of techniques can be used to train a machine learning algorithm, and in general the training process will depend on the type of the machine learning algorithm. That is, each of the first, second, and third machine learning algorithms 124*a*-*c* will comprise a different training process, in general. For example, a univariate long short-term memory may only consider time series of sales and may not use the features extracted earlier, whereas a multivariate long short-term memory will use time series of sales in conjunction with the features extracted earlier. Typically, for a machine learning algorithm, the training method can be an iterative process which seeks to incrementally improve the performance of the machine learning algorithm by adjusting parameters and evaluating the performance in response to the same. As part of a training process, hyperparameter optimization may take place. As part of a training process, the performance of the machine learning algorithm being trained can be assessed against a validation set, which can be formed from at least some of the training data 114*a*, for example, or the test data 114*b*.

Once the machine learning algorithms are trained at item S5, they are deployed at item S6, which can mean that they are available for use by the future sales prediction engine 122 to predict future sales 117. Additionally, as the stock distribution units 200 sell products to consumers and record more sales data, the historical data 112 stored by the stock management system 100 can be updated based on recent sales data 113 which relates to sales which have occurred since the last update to the historical data 112, for example. The recent sales data 113 can be filtered and form training data 114*a* and test data 114*b*.

At item S6, each of the machine learning algorithms 124*a*-124*c* generates a respective predicted sales result 117*a*-*c*. The first machine learning algorithm generates a first predicted sales 117*a*, the second machine learning algorithm 124*b* generates a second predicted sales 117*b*, and the third machine learning algorithm generates a third predicted sales 117*c*. The predicted sales can represent a prediction about future sales based on a time series of sales. That is, given the time series of sales of preceding weeks, the machine learning algorithm predicts sales of a following week. In the present example, the machine learning algorithm predicts a time series of sales of a following week, in that the predicted sales 117*a*-*c* resemble the format of historical data 112, comprising days in association with number of products sold, but wherein the value for number of products sold are predicted values rather than recorded values. In other examples, the machine learning algorithms may produce a total number of sales for a future week without producing predicted sales per day of the future week, for example.

Figure 9:
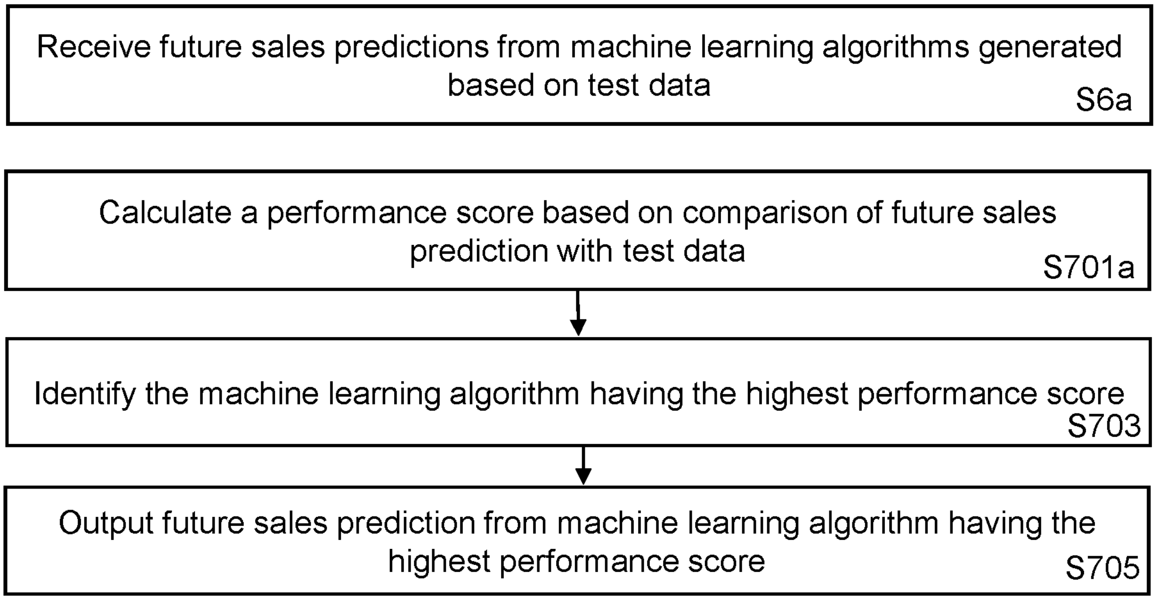
FIG. 9 is a flowchart illustrating steps for evaluating the performance of trained machine learning algorithms of the sales prediction engine based on test data according to examples.
Figure 10:
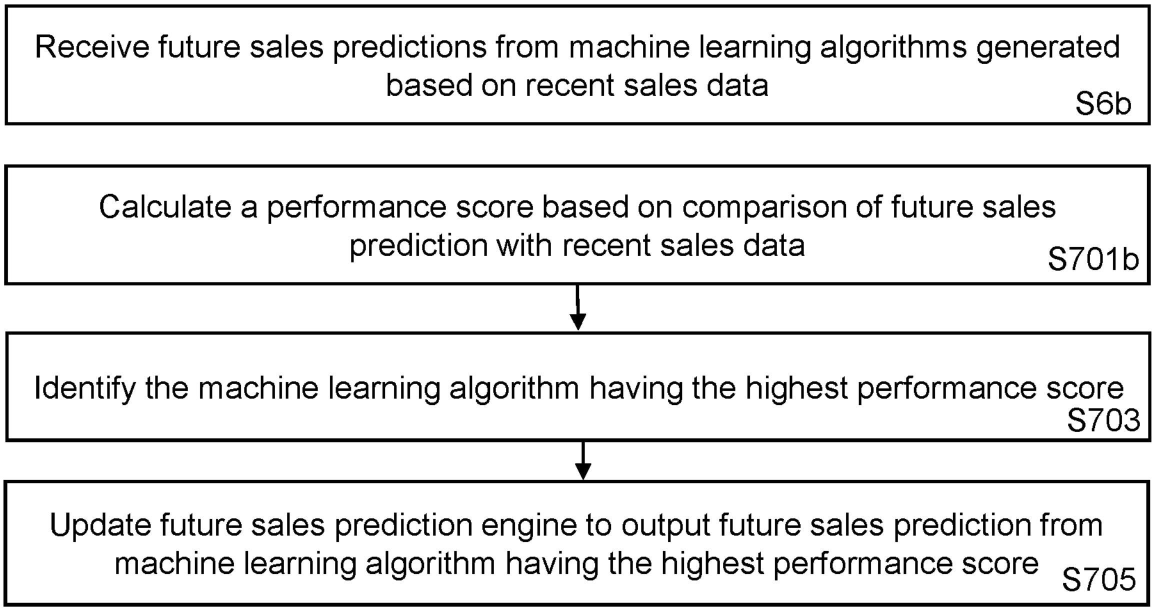
FIG. 10 is a flowchart illustrating steps for evaluating the performance of trained machine learning algorithms of the sales prediction engine based on recent sales data according to examples.

FIGS. 9 and 10 display steps for determining, once the machine learning algorithms have been trained, how the future sales prediction engine 122 determines an overall sales prediction output 128. In FIG. 9, the machine learning algorithms are evaluated prior to having predicted any future sales of the stock distribution units 200 in view of test data derived from historical sales data 112, and in FIG. 10 they are evaluated after having evaluated future sales of the stock distribution units 200 in view of recent sales data 113.

FIG. 9 is a flowchart for determining the output from the future sales prediction engine 122 as part of a sales prediction evaluation 126. In general, this involves using test data 114*b* to assess the performance of the machine learning algorithm. The steps performed at S701*a*-S705 may be substantially similar to steps taken in training the machine learning algorithms, wherein intermediate evaluations of the performance of the machine learning algorithms may be performed to guide the training process, and in some examples may be considered to form part of the training process.

At step S6*a*, future sales predictions 117 are generated by the machine learning algorithms based on test data 114*b*. Steps S701*a*-S705 are performed to compare the relative performances of the plurality of machine learning algorithms.

At item S701*a*, a performance score is calculated based on comparison of future sales predictions 117 with test data 114*b*. The performance score is based on how accurate the future sales predictions 117 are compared with the test data 114*b*.

For example, the future sales prediction 117*a* of the first machine learning algorithm might predict 20 sales of a product in a week based on a first subset of test data (e.g., using the features calculated from the first subset of test data), and a second subset of test data 114*b*, corresponding to a time period subsequent to a time period of the first subset of test data, indicates that 22 sales of product took place in the corresponding week. The performance score is based on the difference between the future sales prediction 117 and the actual sales of the product as indicated in the second subset of the test data. The sales of the second subset of test data 114*b* can be considered to represent a ground truth. If the second machine learning algorithm 124*b* predicted 24 sales, and the third machine learning algorithm 124*c* predicted 19 sales, then the third machine learning algorithm 124*c* can be calculated to have a highest performance score based on a lowest variance from the ground truth of 20 sales.

It will be appreciated that evaluation metrics of variance of the predictions from the ground truth values can be used. For example, any combination of mean squared error, mean absolute error, root mean squared errors and mean absolute percentage errors could be calculated and used in the evaluation process. In some examples, an aggregated performance score which represents a plurality of evaluation metrics could be calculated. As described earlier, the predictions may be made on a day-to-day basis, but the performance score based on an aggregation of the predictions into a prediction for a longer time period, such as a week. This can decrease the importance of day-to-day discrepancies between predicted values and ground truth values in the performance score, for example. It will be appreciated that the aggregation of predictions can take a variety of forms such as a sum total, a median or mean average, or a running average, for example. The calculation of the performance score may be configured to, in some examples, punish predictions which leave to overstocking more than predictions which lead to understocking, for example where products have short shelf lives to avoid wastage. In other examples, the calculation of performance score may be configured to punish predictions which lead to understocking more than predictions which lead to overstocking, such that a stock distribution unit is more likely to carry the necessary quantity of products and customer dissatisfaction at a product being "sold out" is reduced.

At item S703, the third machine learning algorithm is identified and selected to output overall future sales for the future sales prediction engine 122. In other words, the future sales predictions of the other machine learning algorithms 124*a*, 124*b* may be ignored or retained within the engine 122, but not output, due to their lower performance score.

At item S705, future sales from the machine learning algorithm having the highest performance score are output by the future sales prediction engine 122 based on input historical data 112. These future sales are provided to the stock replenishment entity 250 to determine replenishment of stock of the stock distribution units 250.

The aforementioned steps of assessing the best performing machine learning algorithm may take place per product, such that each product is associated with a particular machine learning algorithm for which the performance score is the highest, and so the future sales prediction engine 122 predicts sales for that particular product based on the particular machine learning algorithm with highest performance, for example. The aforementioned steps may take place per stock distribution unit, such that each stock distribution unit is associated with a particular machine learning algorithm for which the performance score is the highest, and so the future sales prediction engine 122 predicts sales for that particular stock distribution unit based on the particular machine learning algorithm with highest performance, for example.

FIG. 10 is a flowchart for monitoring and adjusting the future sales prediction engine 122 based on an updated performance score as part of the sales prediction evaluation 126 during use of the future sales prediction engine 122. FIG. 10 can represent a performance re-evaluation procedure which can take place after the future sales prediction engine 122 has been deployed for a period of time, for example. In general, this process considers that the predictive performance of the machine learning algorithms of the future sales prediction engine 122 may vary with time, and at certain points of time one algorithm may outperform another, and another points in time may underperform relative to another. In this example, the steps of FIG. 10 are performed every two weeks, allowing for two weeks of recent sales data to be recorded. In other examples, the steps of FIG. 10, generally representing a re-evaluation of the performance of the future sales prediction engine 122, may be performed more or less frequently, for example once a day, or once a week, or once a month, or once every six months, or once a year, for example.

At item S6*b*, future sales predictions 117 are generated. In this example the future sales prediction engine 122 has been used for some time and recent sales data 113 has been recorded by the stock distribution units 200 and added to the historical data 112. The predictions 117 of the future sales prediction engine 122 can, for example, be based on product sales recorded by historical data 112 as a whole. The historical data 112 thereby grows with time as further sales are recorded and the historical data 112 updated with the further sales. The accuracy of the future sales prediction engine 122 and the constituent machine learning algorithms can improve as the historical sales data 112 increases in size. In examples, predictions 117 of the future sales prediction engine 122 are based on the historical data 112 as a whole but with a bias towards the recent sales data 113 portion, or based solely on recent sales data 113.

At item S701*b*, a performance score is calculated based on evaluation metrics, similar to S701*a*. In some examples, this is based solely on comparison of future sales predictions 117 with recent sales data 113. In other examples, the machine learning algorithms are retrained based on the previous historical data in addition to the recent sales data, and performance evaluation is performed as per S701*a*. Because the historical data grows as further sales are recorded and added to the historical data, further products which had, as part of a previous training, been previously filtered out at item S2 may no longer be too sparse, for example, and so the future sales prediction engine 122 can be used to predict sales for these further products. In some such other examples, performance evaluation is biased towards the recent sales data portion such that an error detected between predicted sales and actual sales are weighted higher for a more recent day compared to an error detected for a more previous day. More generally, this step involves performing a new performance evaluation based on the recent sales data 113 and, in examples, previous historical sales data too.

Figure 11:
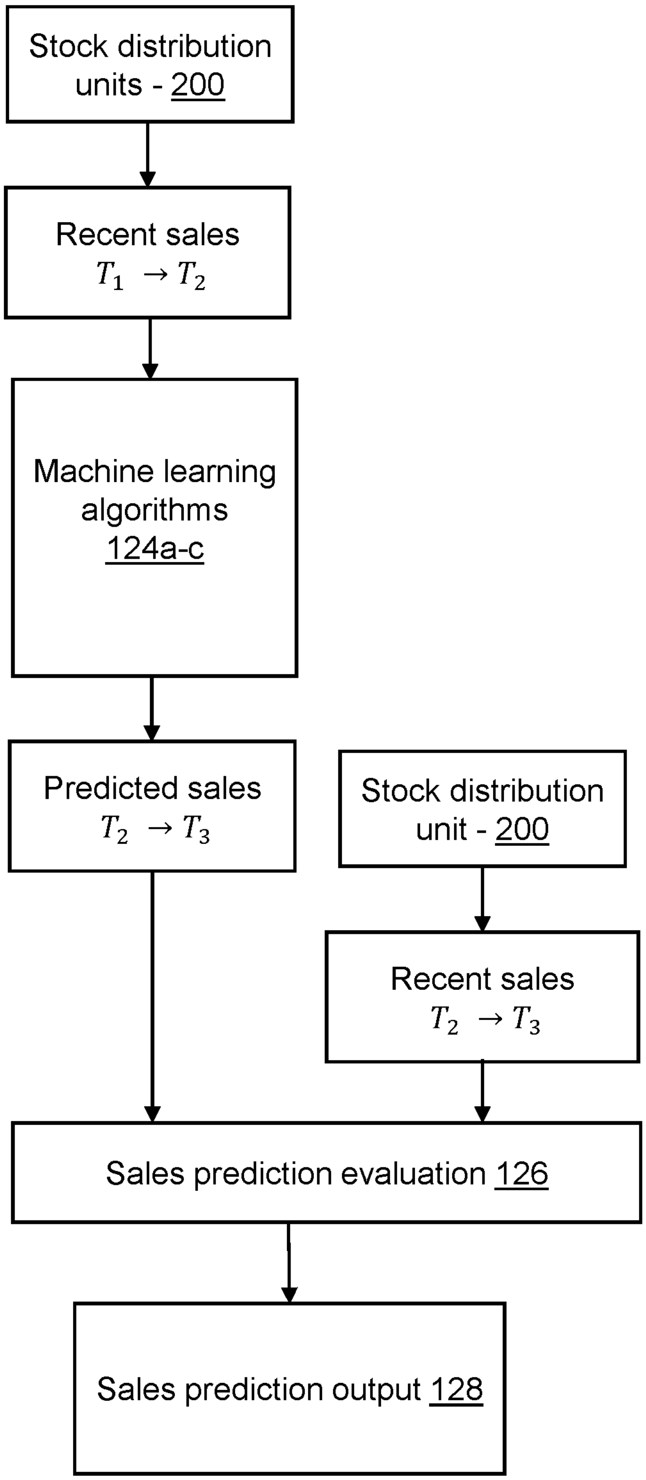
FIG. 11 is a flowchart illustrating steps performed in a re-evaluation process performed by the sales prediction engine according to examples.

FIG. 11 illustrates a flowchart detailing on example of how A701 might be performed, in examples. Initially, the stock distribution units 200 provide recent sales data 113 correspond to a first time period $T_1 \rightarrow T_2$. The machine learning algorithms generate predicted sales for a future second time period $T_2 \rightarrow T_3$. The predicted sales for the second time period $T_2 \rightarrow T_3$ are stored for later use. The stock distribution units 200 record the sales during the second time period $T_2 \rightarrow T_3$. Once the second time period $T_2 \rightarrow T_3$ has occurred, a sales prediction evaluation based on the second time period $T_2 \rightarrow T_3$ can be performed, comparing the recorded recent sales 113 received from the stock distribution units 200 during this time period, and the predicted sales 117 predicted by the machine learning algorithms 124*a-c* prior to this time period.

Items S703 then proceeds as described for FIG. 9 to identify the best performing machine learning algorithm based on the recent sales data 113. The overall output sales prediction of the future sales engine 122 can be updated based on the machine learning algorithm having the new highest performance score at item S705. In this way, throughout deployment of the future sales prediction engine 122, the performance can be monitored and improved by ensuring the output is based on the best performing machine learning algorithm. In addition, the machine learning algorithms can be retrained based on the addition of recent sales data 113 to the training data 114*a*.

Above embodiments are to be understood as illustrative examples of the invention. It is be understood that any feature described in relation to any one embodiment may be used alone, or in combination with other features described, and may also be used in combination with one or more features of any other of the embodiments, or any combination of any other embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A method for training a machine learning, ML, system to predict sales of a plurality of products available in a vending machine, the method comprising:

receiving historical data comprising a plurality of time series of sales, each time series of sales associated with a product of the plurality of products and representing sales of the product from the vending machine on a plurality of days;

filtering the historical data to form filtered historical data by, for each time series of sales of the plurality of time series of sale:

determining a ratio between (i) a number of days of the plurality of days represented by the time series of sales on which the vending machine sold zero units of the product associated with the time series of sales; and (ii) a total number of days of the plurality of days represented by the time series of sales, such that the ratio is a proportion of the total number of days on which the product sold zero units;

comparing the ratio to a predefined threshold ratio; and
filtering from the historical data, conditional upon the ratio being less than the predefined threshold ratio, the time series of sales of the product;
training each of a plurality of machine learning algorithms using the filtered historical data;
for each of the plurality of products, evaluating a performance score for each of the plurality of machine learning algorithms against test data and identifying the machine learning algorithm having a highest performance score for that product;
receiving new data comprising sales of the plurality of products from the vending machine relating to a time period subsequent to the training;
retraining each of the plurality of machine learning algorithms using at least parts of the new data in addition to the filtered historical data, wherein the filtering of the historical data varies dynamically upon retraining such that time series of sales previously filtered from the historical data may be included in the retraining where the ratio of zero-sales days to total days no longer exceeds the predefined threshold ratio;
re-evaluating the performance score for each of the plurality of machine learning algorithms based on the new data;
dynamically updating, for each product, the identified machine learning algorithm to the machine learning algorithm having the highest updated performance score for that product;
generating, via the ML system, predicted sales data for the vending machine based on recent sales data of the vending machine; and
instructing a stock replenishment entity to restock the vending machine based on the predicted sales data.

2. The method of claim 1, wherein filtering the historical data to form filtered historical data further comprises, for each time series of sales of the plurality of time series of sales:
determining from the time series of sales whether a total sales duration, corresponding to a time between a first sale and a most recent sale of the time series of sales, exceeds a predefined threshold total sales duration; and
filtering the time series of sales from the historical data, conditional upon the total sales duration being less than the predefined threshold total sales duration.

3. The method of claim 1, wherein filtering the historical data to form filtered historical data further comprises, for each time series of sales of the plurality of time series of sales:
determining from the time series of sales whether an intermediate sales duration, corresponding to a time between a first sale and a second sale of the times series of sales, exists which exceeds a predefined threshold intermediate sales duration, the first sale and the second sale being consecutive sales of the product associated with the time series of sales; and
filtering the time series of sales from the historical data, conditional upon an intermediate sales duration existing which exceeds the predefined threshold total sales duration.

4. The method of claim 1, further comprising, for each time series of sales in the filtered historical data, and for each day of the plurality of days represented by the time series of sales:
extracting one or more features relating to the day from the time series of sales in the filtered historical data, and associating each feature to the sales of the day, and,
using at least parts of the extracted one or more features for training each of the plurality of machine learning algorithms.

5. The method of claim 4, wherein extracting one or more features from the filtered historical data comprises extracting a temporal feature, the temporal feature being at least one of: a number of the day during a month the day corresponds to, a number of the month the day corresponds to, a number of the year that the day corresponds to, a number of the day during a week it corresponds to, a flag indicating whether the day corresponds to a weekend, or a flag indicating whether the day corresponds to a federal holiday.

6. The method of claim 5, wherein extracting one or more features from the filtered historical data comprises extracting a cyclically transformed feature which corresponds to the temporal feature being transformed by a sinusoidal function, the sinusoidal function having a period corresponding to a characteristic cyclical behavioral period of the time series of sales.

7. The method of claim 6, wherein the temporal feature is the number of the day and the characteristic cyclical behavioral period is a month the day corresponds to, or the temporal feature is a month the day corresponds to, and the characteristic cyclical behavioral period is a year.

8. The method of claim 4, wherein extracting one or more features from the filtered historical data comprises extracting one or more aggregated sales features corresponding to an aggregation of sales of the time series of sales across a number of days of the time series of sales.

9. The method of claim 8, wherein the aggregated sales feature corresponds to an average sales per day across a week, or a total sales for the week.

10. The method of claim 4, further comprising receiving weather conditions data corresponding to the historical data, the weather conditions data comprising weather data in association with time periods; and
wherein extracting one or more features from the filtered historical data comprises determining, using the weather conditions data, for each day of the plurality of days represented by the time series of sales, a weather conditions feature corresponding to weather conditions during the day.

11. The method of claim 10, wherein the weather conditions feature comprises at least one from: a number indicating a maximum temperature during the day, a number indicating a minimum temperature during the day, a number indicating an average temperature during the day, a number indicating a maximum humidity during the day, a number indicating a minimum humidity during the day, a number indicating an average humidity during the day, and a number indicating a total rainfall during the day.

12. The method of claim 1, wherein the method further comprises
dividing the filtered historical data into training data and test data.

13. The method of claim 1, wherein the plurality of machine learning algorithms comprises at least two from:
(i) a gradient boosted decision tree algorithm,
(ii) a random forest ensemble learning algorithm, and
(iii) a long short-term memory neural network algorithm.

14. The method of claim 12, wherein determining the performance score comprises computing at least one from:
(i) mean squared error,
(ii) mean absolute error,
(iii) root mean squared error, and
(iv) mean absolute percentage error of predictions from the machine learning algorithm compared with the sales represented by the test data, the highest performance score corresponding to a lowest respective error.

15. The method of claim 12, wherein each machine learning algorithm generates a respective predicted time series of sales corresponding to a plurality of days, each day comprising a predicted number of sales of a product; and wherein evaluating the performance score comprises aggregating the predicted number of sales across a number of days of the plurality of days into aggregated predicted sales data, and aggregating a number of sales of the test data across the number of days into aggreged test data, and determining a performance score based on the aggregated predicted sales data and the aggregated test data.

16. A system for training a machine learning (ML) system comprising, one or more processors; and one or more non-transitory computer-readable media storing instructions executable by the one or more processors, wherein the instructions, when executed, cause the system to perform operations comprising:

receiving historical data comprising a plurality of time series of sales, each time series of sales associated with a product of the plurality of products and representing sales of the product from the vending machine on a plurality of days;

filtering the historical data to form filtered historical data by, for each time series of sales of the plurality of time series of sale:

determining a ratio between (i) a number of days of the plurality of days represented by the time series of sales on which the vending machine sold zero units of the product associated with the time series of sales; and (ii) a total number of days of the plurality of days represented by the time series of sales, such that the ratio is a proportion of the total number of days on which the product sold zero units;

comparing the ratio to a predefined threshold ratio; and filtering from the historical data, conditional upon the ratio being less than the predefined threshold ratio, the time series of sales of the product;

training each of a plurality of machine learning algorithms using the filtered historical data;

for each of the plurality of products, evaluating a performance score for each of the plurality of machine learning algorithms against test data and identifying the machine learning algorithm having a highest performance score for that product;

receiving new data comprising sales of the plurality of products from the vending machine relating to a time period subsequent to the training;

retraining each of the plurality of machine learning algorithms using at least parts of the new data in addition to the filtered historical data, wherein the filtering of the historical data varies dynamically upon retraining such that time series of sales previously filtered from the historical data may be included in the retraining where the ratio of zero-sales days to total days no longer exceeds the predefined threshold ratio;

re-evaluating the performance score for each of the plurality of machine learning algorithms based on the new data;

dynamically updating, for each product, the identified machine learning algorithm to the machine learning algorithm having the highest updated performance score for that product;

generating, via the ML system, predicted sales data for the vending machine based on recent sales data of the vending machine; and instructing a stock replenishment entity to restock the vending machine based on the predicted sales data.

17. The system of claim 16, wherein the instructions further cause the system to perform actions comprising:

determining from the time series of sales whether a total sales duration, corresponding to a time between a first sale and a most recent sale of the time series of sales, exceeds a predefined threshold total sales duration; and filtering from the historical data, conditional upon the total sales duration being less than the predefined threshold total sales duration, the time series of sales.

18. A non-transitory computer-readable media storing instructions executable by one or more processors, wherein the instructions, when executed, cause the one or more processors to perform operations for training a machine learning (ML) system comprising:

receiving historical data comprising a plurality of time series of sales, each time series of sales associated with a product of the plurality of products and representing sales of the product from the vending machine on a plurality of days;

filtering the historical data to form filtered historical data by, for each time series of sales of the plurality of time series of sale:

determining a ratio between (i) a number of days of the plurality of days represented by the time series of sales on which the vending machine sold zero units of the product associated with the time series of sales; and (ii) a total number of days of the plurality of days represented by the time series of sales, such that the ratio is a proportion of the total number of days on which the product sold zero units;

comparing the ratio to a predefined threshold ratio; and filtering from the historical data, conditional upon the ratio being less than the predefined threshold ratio, the time series of sales of the product;

training each of a plurality of machine learning algorithms using the filtered historical data;

for each of the plurality of products, evaluating a performance score for each of the plurality of machine learning algorithms against test data and identifying the machine learning algorithm having a highest performance score for that product;

receiving new data comprising sales of the plurality of products from the vending machine relating to a time period subsequent to the training;

retraining each of the plurality of machine learning algorithms using at least parts of the new data in addition to the filtered historical data, wherein the filtering of the historical data varies dynamically upon retraining such that time series of sales previously filtered from the historical data may be included in the retraining where the ratio of zero-sales days to total days no longer exceeds the predefined threshold ratio;

re-evaluating the performance score for each of the plurality of machine learning algorithms based on the new data;

dynamically updating, for each product, the identified machine learning algorithm to the machine learning algorithm having the highest updated performance score for that product;

generating, via the ML system, predicted sales data for the vending machine based on recent sales data of the vending machine; and instructing a stock replenishment entity to restock the vending machine based on the predicted sales data.

19. The non-transitory computer-readable media of claim 18, wherein the operations further comprise at least one of:

determining from the time series of sales whether a total sales duration, corresponding to a time between a first sale and a most recent sale of the time series of sales, exceeds a predefined threshold total sales duration; and filtering from the historical data, conditional upon the total sales duration being less than the predefined threshold total sales duration, the time series of sales.

* * * * *